United States Patent [19]
Emrich

[11] Patent Number: 5,097,946
[45] Date of Patent: Mar. 24, 1992

[54] STORAGE UNIT FOR COMPACT DISCS AND THE LIKE

[76] Inventor: Richard A. Emrich, 10666 LeMans Dr., Dallas, Tex. 75238

[21] Appl. No.: 505,890

[22] Filed: Apr. 6, 1990

[51] Int. Cl.⁵ .............................................. B65D 85/57
[52] U.S. Cl. .................................. 206/45.11; 206/309; 312/12; 312/15
[58] Field of Search ............... 206/307, 309, 310, 312, 206/387, 45.116, 425, 444; 312/8, 10, 12, 15, 16, 18; 211/40

[56] References Cited

U.S. PATENT DOCUMENTS

| | | | |
|---|---|---|---|
| 3,836,222 | 9/1974 | Kuntze | 206/387 X |
| 4,566,344 | 1/1986 | Ackeret | 74/10.33 |
| 4,647,117 | 3/1987 | Ackeret | 312/12 |
| 4,664,261 | 5/1987 | Frodelius | 206/387 |
| 4,678,245 | 7/1987 | Fouassier | 206/387 X |
| 4,702,369 | 10/1987 | Philosophe | 206/309 X |
| 4,702,533 | 10/1987 | Seifert | 206/387 X |
| 4,705,166 | 11/1987 | Ackeret | 206/309 |
| 4,714,157 | 12/1987 | Morrone | 206/309 |
| 4,900,107 | 10/1990 | Long et al. | 312/15 |
| 4,932,522 | 6/1990 | Milovich | 206/309 |

Primary Examiner—Paul T. Sewell
Assistant Examiner—Jacob K. Ackun, Jr.
Attorney, Agent, or Firm—John M. Cone

[57] ABSTRACT

A storage unit for CD discs comprises a box-like housing in which is mounted a vertical spaced array of horizontally disposed sleds. The sleds slide in and out of the housing on tracks provided in the housing sidewalls. Conventional CD jewel boxes are retained on the sleds and a rod engaging the underside of the lid of each jewel box passes through the jewel box with its ends engaged in a groove formed in the side walls of the unit. The grooves are configured to move the rod vertically away from the sled as the sled is moved out from the housing. The vertical movement of the rod forces the lid of the CD up, giving the user access to the CD stored in the jewel box.

8 Claims, 3 Drawing Sheets

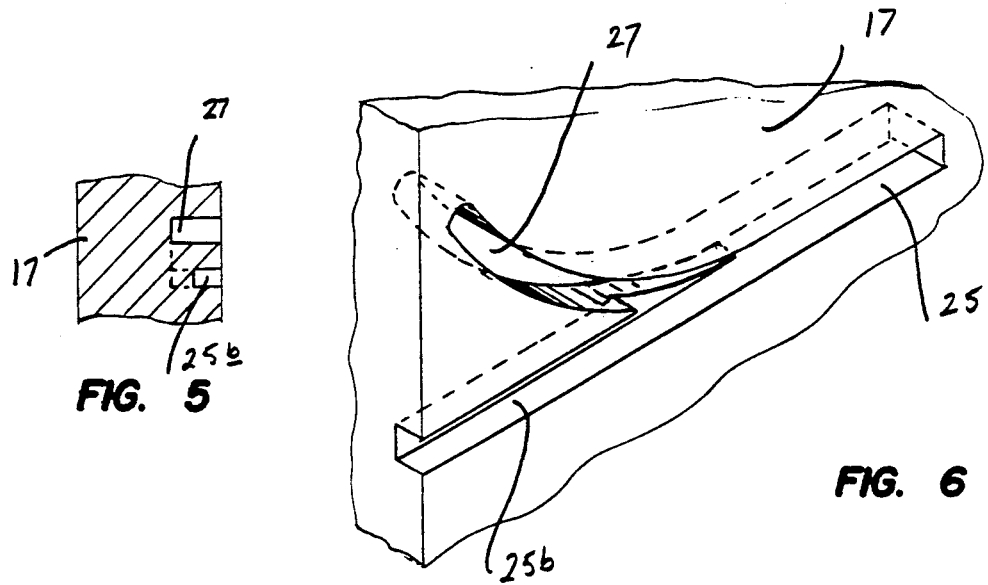
FIG. 5
FIG. 6
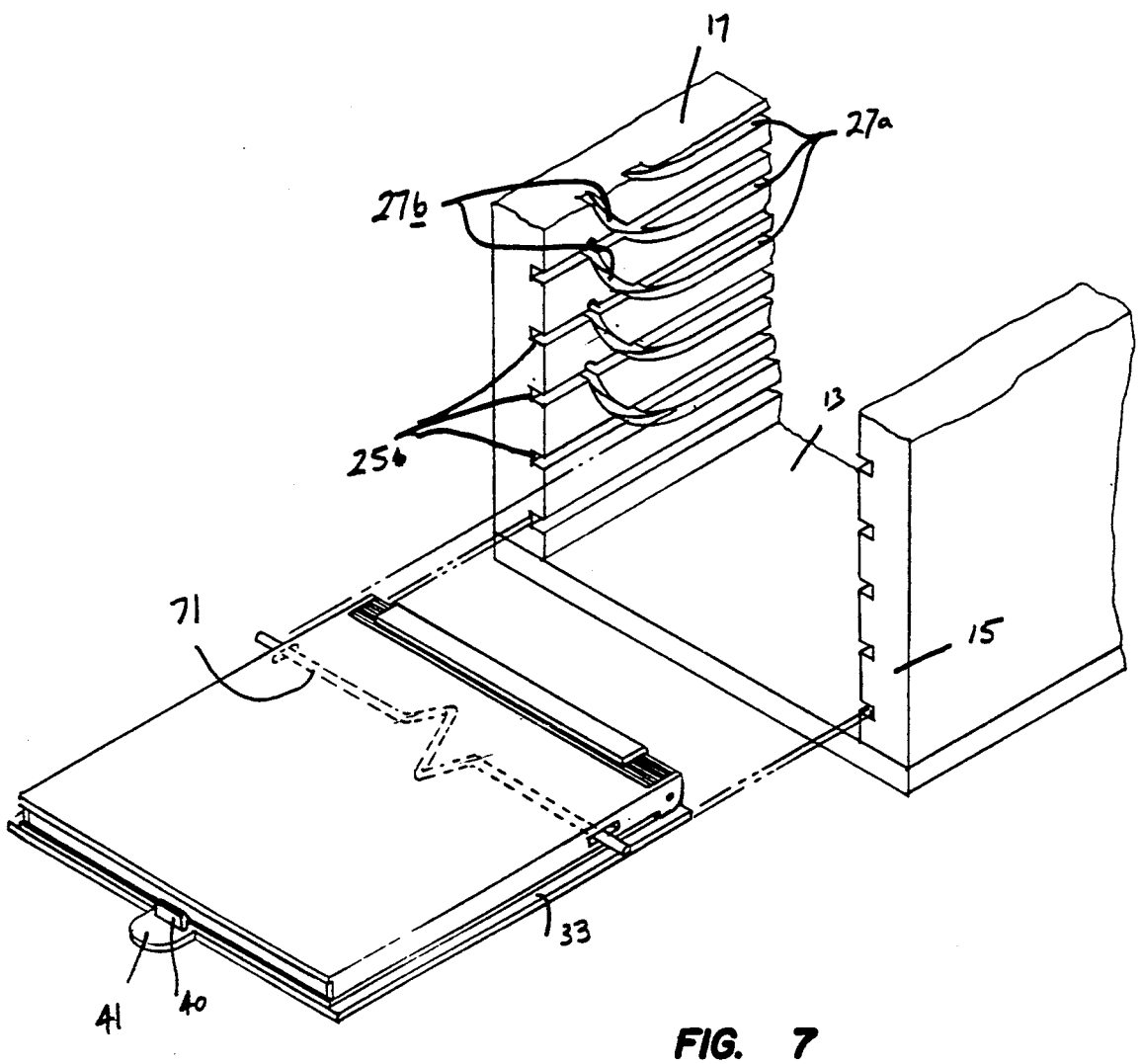
FIG. 7

STORAGE UNIT FOR COMPACT DISCS AND THE LIKE

FIELD OF THE INVENTION

The present invention relates to units for storing compact discs and the like employing the conventional Sony/Philips jewel box which has a standard construction well known in the art.

BACKGROUND OF THE INVENTION

Numerous proposals have been made in this art for storage units in which a CD holder is movable in and out of a housing. For example, U.S. Pat. No. 4,760,502 (Ackeret) discloses a storage container in which CD's are stored on a platform which is slideable in and out of a housing and has a spring-loaded front which drops down to give access to the CD when the platform is in the out position. U.S. Pat. No. 4,678,245 (Fouassier) discloses a storage device in which discs are slid in and out of a housing on horizontal rails provided on the side walls of the housing. U.S. Pat. No. 4,702,369 discloses a storage container similar in appearance to a conventional jewel box, but in which, in addition to a hinged lid, the box has an open front allowing an inner, disc-receiving, member to slide out through the front of the box.

OBJECTS OF THE INVENTION

It is an object of the invention to provide a storage unit for CD's, which makes use of conventional CD jewel boxes, and in which the jewel boxes open automatically when partially withdrawn from the unit.

SUMMARY OF THE INVENTION

The present invention provides a storage unit for compact discs and the like comprising an essentially rectangular housing; side walls of said housing; a plurality of sled means mounted within the housing on which jewel boxes for compact discs can be mounted, in use; track means on the side walls with which said sled means are movably engaged to permit individual sleds to be moved in and out of the unit; and means for opening the lid of a jewel box mounted on a sled when that sled is drawn forward and moved partially out of the unit.

BRIEF DESCRIPTION OF THE DRAWINGS

The invention will now be described by way of example only, with reference to the accompanying drawings, in which:

FIG. 5 is a vertical section on the line 5—5 in FIG. 4;

FIG. 6 is a perspective view showing a detail of the unit in FIG. 1; and

FIG. 7 is a front perspective view of an alternative design of storage unit embodying the invention.

DESCRIPTION OF PREFERRED EMBODIMENTS

Figure 1:
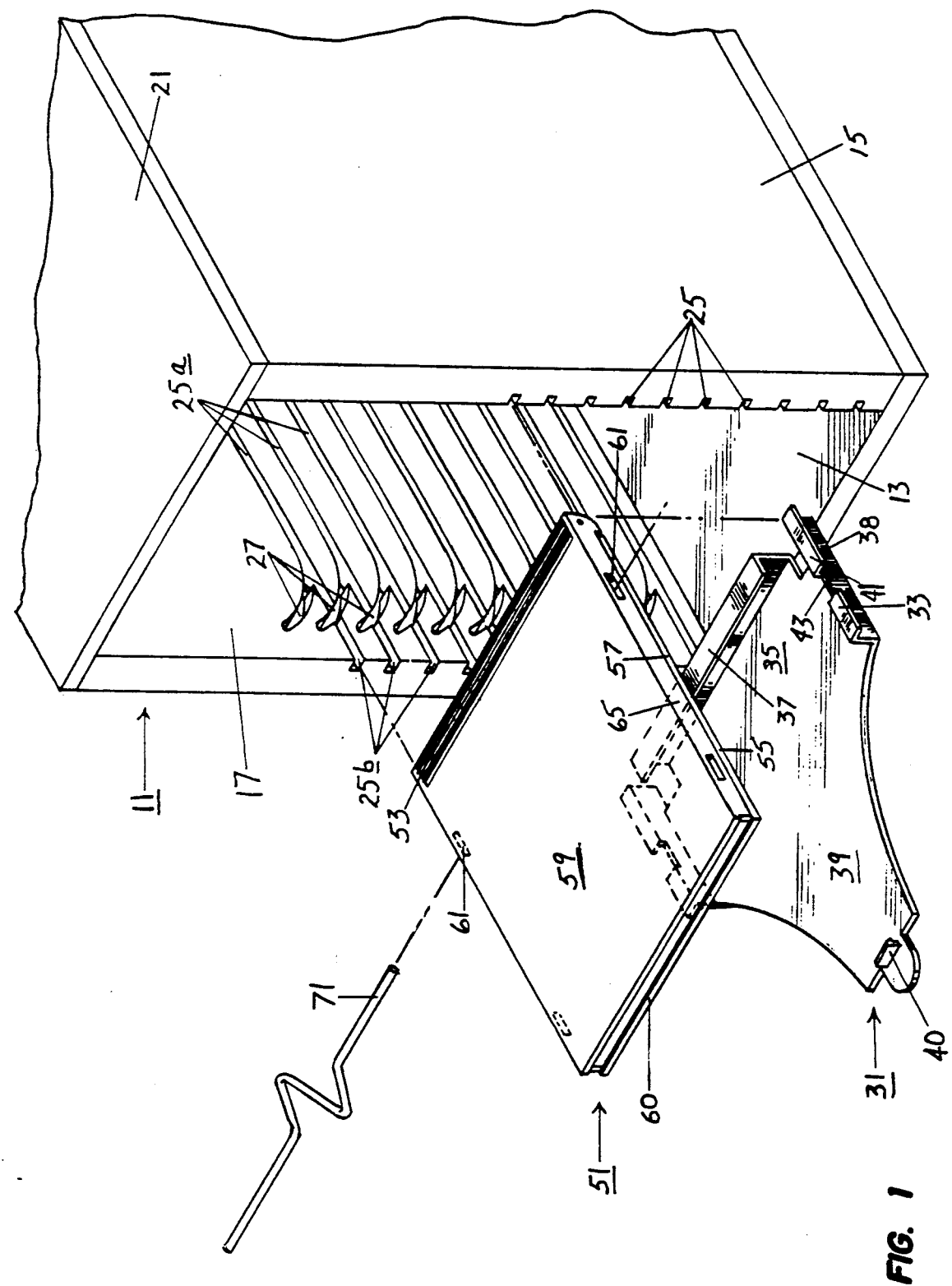
FIG. 1 is a front perspective view of a storage unit for CDs embodying the invention showing one of the sleds and its associated jewel box partially withdrawn from the unit and exploded to reveal detail.

A storage unit for compact discs, such as 5" audio discs, comprises an essentially box-shaped, i.e., rectangular in its horizontal cross-section, housing 11 consisting of a base 13, side walls 15 and 17, a rear wall (not shown) and a top wall 21. The rear wall may be removably secured, as by screws (not shown), for a purpose discussed below. The front face of the unit is open in this embodiment of the invention, though it will be appreciated that a removable front wall, or a hinged front wall that could be opened and closed could be provided, if desired.

The side walls 15 and 17 are provided with a plurality of registering pairs of parallel grooves 25, each grove 25 in the side wall 15 being aligned with a corresponding groove in the side wall 17. The grooves 25 are open-ended at the back of the walls 15 and 17 and each consists of a first portion 25a which extends from the back of the wall substantially horizontally. The initial parallel portion 25a of each of the grooves 25 is at least 5" long. After the initial sections 25a, and groove 25 divides into a portion 27 which curves upwardly and away from the horizontal plane containing the first groove portion 25a and a portion 25b which is a continuation of the initial portion 25a and is substantially horizontal. For reasons discussed below, each upwardly curved groove portion 27, as best seen in FIG. 6, is substantially deeper than the groove portion 25b.

Figure 2:
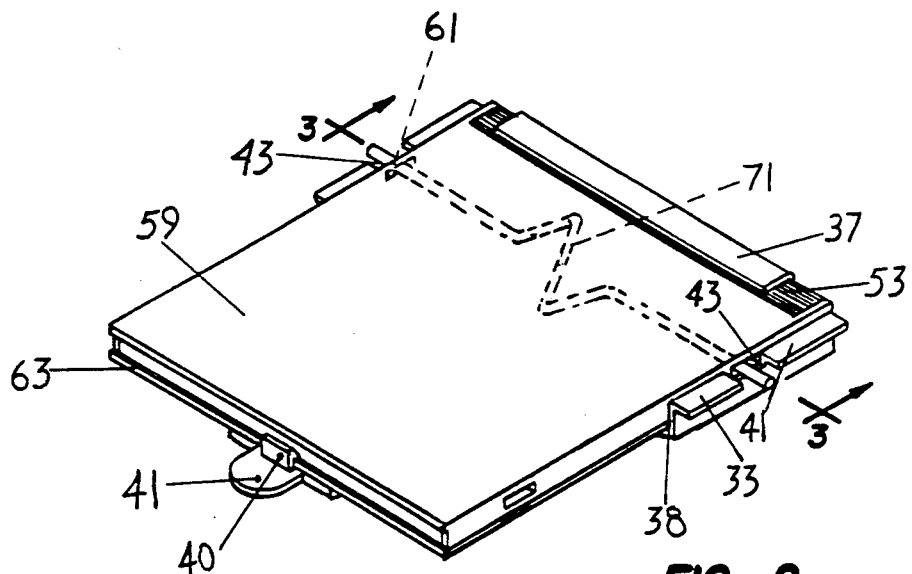
FIG. 2 is a perspective view of the jewel box and sled shown in FIG. 1.
Figure 3:
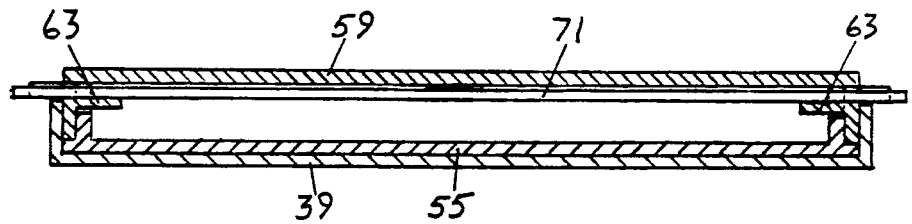
FIG. 3 is a vertical section on the line 3—3 in FIG. 2.
Figure 4:
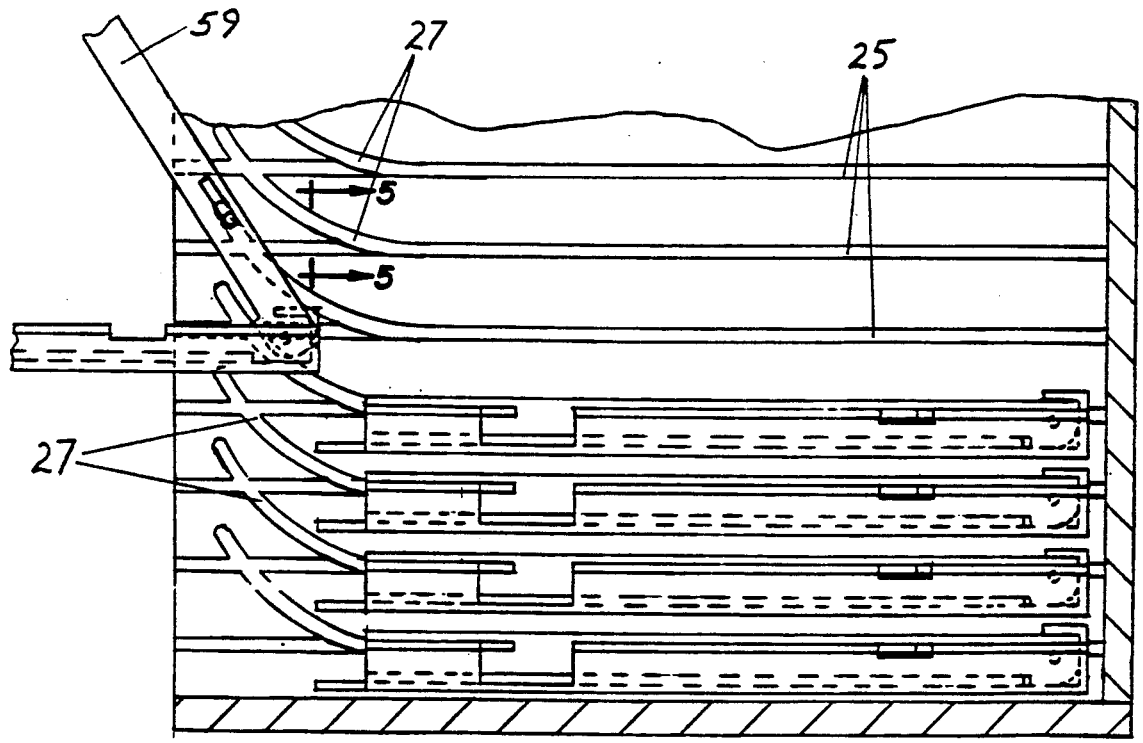
FIG. 4 is a vertical side elevation showing part of the unit shown in FIG. 1, with one side wall omitted to reveal interior detail and showing one of the sleds and its associated jewel box partially withdrawn from the unit.

FIGS. 2 and 3 show one of a plurality of sleds 31 that are mounted in the housing 11. Each sled 31 comprises laterally extending runners 33, which slide in the grooves 25, enabling the sleds 31 to be moved into and out of the housing 11. Each sled 31 comprises a base 35, an rear L-shaped portion 37 extending upwardly from the rear of the base 35, left and right side portions 38 upstanding from the sides of the base 35 and a forwardly projecting yoke portion 39, which provides, at its forward end, a tab 41 which the user of the unit may grasp to move the sled 31 in and out of the housing 11. A resilient retaining latch 40 is provided on the front of the yoke portion 39. As best seen in FIG. 1, the latch 40 extends perpendicularly to the base 35 of the sled 31 and has a ramped upper surface 42 and a retaining face 44.

The runners 33 are provided by laterally projecting flanges 41 extending from the side portions 38. As seen in FIG. 2, the side portions 38 and flanges 41 extend approximately 2¼ forward from the rear of the sled 31 and have omitted regions 43 about ½ long, in register, on either side of the sled 31, starting about 1¼ from the rear of the sled 31.

As best seen in FIG. 1, a standard CD jewel box 51, the construction of which is well known in the art, is mounted on each sled 31. The base 55 of the jewel box 51 is mounted on the base 35 of the sled with hinged edge 53 of the jewel box 51 accommodated within the channel formed by the base 35 and rear L-shaped portion 37 of the sled 31. The side portions 38 of the sled 31 extend along the side walls 57 of the jewel box 51 and are spaced a distance sufficient from those sides 57 to enable the lid 59 of the jewel box 51 to open and close without obstruction. The front lip 60 on the base 55 of the jewel box 51 is retained by the retaining latch 40 to hold down the front of the jewel box 51 on the base 35 of the sled 31.

The openings formed by the omitted regions 43 are in register with a pair of openings 61 in the lid 59 of the jewel box 51 adjacent to one of two pairs of ears 63 (seen in FIG. 3, but omitted from other Figures for clarity) that extend inwardly from the side wall 65 of the lid 59 to provide means for mounting a printed card giving information about the content of the CD to be stored in the jewel box 51.

A flexible, compressible rod 71, of circular cross-section, and a length greater than the width of the CD jewel box 51, extends through the openings 61 with its ends projecting beyond the sled side portions 39 into one pair of the grooves 27. As illustrated in FIG. 2, the rod 71 may have Z-shaped central portion and be made of a resilient material, such as the plastic material Delrin.

To load CD's into the unit, a plurality of conventional jewel boxes 51 are mounted each on a sled 35 as discussed above. One sled 35 is now inserted into the housing from the front with the runners 33 sliding into the pairs of open ends of the groove portions 25b. The flexible rod 71 is next compressed to allow its ends to enter into the groove portions 25b. As the sled 35 is pushed back into the unit, the rod 71 eventually reaches the deeper portion 25a of the groove 25, whereupon the rod 71 re-extends to its full length. When the sled 35 is pulled forward, the rod 71, now extended, cannot enter the shallow groove portion 25b and instead, follows the groove portion 27. In an alternative form of the invention, the rod 71 is non-compressible and the sleds 35 are loaded into the unit by removing its rear wall and inserting the runners 33 and rod 71 into the open rear ends of the grooves 25. When the desired number of jewel boxes 51 and sleds 35 has been loaded into the housing, the rear wall 19 is replaced, securing the jewel boxes 51 against removal from the housing 11.

After loading, the tab 41 of each sled can be grasped from the front of the housing 11 and by pulling on a particular tab 41 a selected jewel box 51 is moved forward partially through the open front of the housing 11, causing the lid 59 to open to give access to the CD therein as described below.

If the sled 35 is initially fully within the housing 11, as the sled 35 moves forward, the runners 33 and the rod 71 slide initially along the groove portion 25a. While the rod 71 moves along the initial section 25a of the groove 25, the lid 59 of the jewel case 51 remains closed. When the rod 71 reaches the divergence between the groove portion 27 and 25b, it is forced to enter the portion 27 because the portion 25b is not sufficiently deep to accommodate it. As the rod 71 starts to travel along the curved portion 27, it is forced upwardly by engagement with the ramp constituted by the portion 27. As the runners 33 and L-shaped rear portion 37 of the sled 35 hold the base 55 of the jewel box 51 down, the upward motion of the rod 71 exerts a force on the lid 59 of the jewel box 51, separating it from the base 55, giving access to the CD stored in the jewel box 51.

When the sled 35 is pushed back into the housing 11, the lid 59 closes as the rod 71 travels back down the groove portion 27.

An alternative form of the invention is shown in FIGS. 7. The alternative form is substantially similar to the form shown in FIGS. 1 through 6 and like parts have been given the same reference numbers. In the unit illustrated in FIG. 7, however, the laterally extending flanges 41 that provide the runners 33 are located along the bottom of the sled side portions 39, so as to be in substantially below the horizontal plane is which the rod 71 is disposed.

In this alternative from, vertically separated pairs of grooves 25 and 27 are provided, with the groove 27 for the rod 71 spaced above the associated groove 25 for the runners 33. The grove 25 is essentially horizontal for its entire length. The groove 27 has an initial, rear, portion 27a which is horizontal and parallel to the groove 25 and an upwardly curved forward portion 27b. The groove 27 is deeper than the groove 25 so that the rod 71 cannot enter a groove 25, but must follow the ramped groove 27, even where the two intersect.

What I claim is:

1. A storage unit for compact discs comprising: an essentially box-shaped housing; side walls of said housing; a plurality of means mounted within the housing on which jewel boxes for compact discs can be mounted, in use; first track means on the side walls with which said box mounting means are movably engaged to permit individual box mounting means to be moved in and out of the housing through an open front thereof; and means for opening the lid of a jewel box mounted on a mounting means when that mounting means is moved partially out of the housing, said lid opening means comprising means extending laterally from the jewel box and engaged with the lid thereof, and second track means in the side walls with which outer ends of said lid opening means are engaged and which are increasingly spaced apart from the first track means in the direction of the open front of the housing.

2. A unit according to claim 1 wherein the opening means include a member engaged, in use, with the lid of a jewel box and having laterally extending end portions slideably engaged in the second track means.

3. A unit according to claim 1 wherein the peg means are constituted by the ends of a rod passing through openings in the lid of the jewel box.

4. A unit according to claim 3 wherein the rod is compressible along its axis to enable it to be inserted into grooves in the side walls of the unit when a jewel box engaged rod is loaded into the housing.

5. A storage unit according to claim 1 wherein the sled means comprises a base for receiving the conventional jewel box having a rear channel member for engaging the hinged edge of the jewel box and a forward latch member for engaging the front lip of the jewel box.

6. A storage unit for compact discs comprising a housing, a plurality of sleds, each of which, in use, accommodates a CD jewel box, means for slideably mounting said sleds for individual movement into and out of the housing through an open front thereof, said mounting means comprising substantially horizontally disposed aligned pairs of grooves in opposed side walls of the housing, and laterally projecting runners on the lateral edges of each sled slideably engaged in opposed grooves, means for opening the lid of each jewel box as said jewel box is moved out of the housing, said lid opening means comprising a member which is engaged with the lid of the jewel box and which has outer ends that extend beyond the sled and engage in oppositely disposed second pairs of grooves in the side walls of the housing, which second grooves diverge increasing from the first grooves in an upwardly vertical direction towards the open front of the housing.

7. A storage unit according to claim 6 wherein said lid opening means comprises a compressible rod-like member, the outer ends of which are resiliently and outwardly urged.

8. A storage unit according to claim 7 wherein said second and first grooves are coextensive towards the interior of the box and diverge only toward the open front, said first grooves having less depth than said second grooves so that, when they diverge, the outwardly urged ends of the rod-like member follow the second grooves.

* * * * *